United States Patent [19]

Lerich

[11] 3,750,519

[45] Aug. 7, 1973

[54] ANCHOR BOLT WITH EXPANSION SLEEVE
[75] Inventor: Lester Lerich, Broomfield, Colo.
[73] Assignee: Wej-It Expansion Products, Inc., Broomfield, Colo.
[22] Filed: Oct. 20, 1971
[21] Appl. No.: 190,810

[52] U.S. Cl. .................................. 85/77, 85/76
[51] Int. Cl. ............................................ F16b 13/06
[58] Field of Search ..................... 85/75, 76, 77, 85

[56] References Cited
UNITED STATES PATENTS

| | | | |
|---|---|---|---|
| 3,171,322 | 3/1965 | Kaplan | 85/77 |
| 3,175,455 | 3/1965 | Reddy | 85/75 |
| 3,448,651 | 6/1969 | Passen | 85/77 |
| 997,916 | 7/1911 | Jeremiah | 85/77 |
| 3,277,770 | 10/1966 | McCulloch | 85/77 |
| 1,756,419 | 4/1930 | Zifferer | 85/75 |

FOREIGN PATENTS OR APPLICATIONS

| | | | |
|---|---|---|---|
| 575,724 | 3/1946 | Great Britain | 85/75 |
| 424,187 | 8/1947 | Italy | 85/75 |

Primary Examiner—Edward C. Allen
Attorney—Reilly and Lewis

[57] ABSTRACT

An anchor bolt includes a bolt portion having an expansion sleeve and in one embodiment a spacer collar concentrically mounted thereon in axially aligned abutting relationship with each other. The expansion sleeve has a trailing end with a collar portion and three circumferentially spaced wedging sections extending toward its opposite leading end. The wedging sections are connected to the collar portion by relatively narrow neck portions which flare out into wider wedging portions at the leading end of the sleeve. Longitudinally extending flattened bearing surfaces on a head portion of the bolt forwardly of the expansion sleeve diverge outwardly in the direction of the leading end of the bolt portion so that when the expansion sleeve is axially moved toward the head by an axially adjustable trailing pressure member on the bolt portion, the bearing surfaces will cause the wedging sections to expand circumferentially due to flexing of the narrow neck portions.

2 Claims, 6 Drawing Figures

Patented Aug. 7, 1973
3,750,519
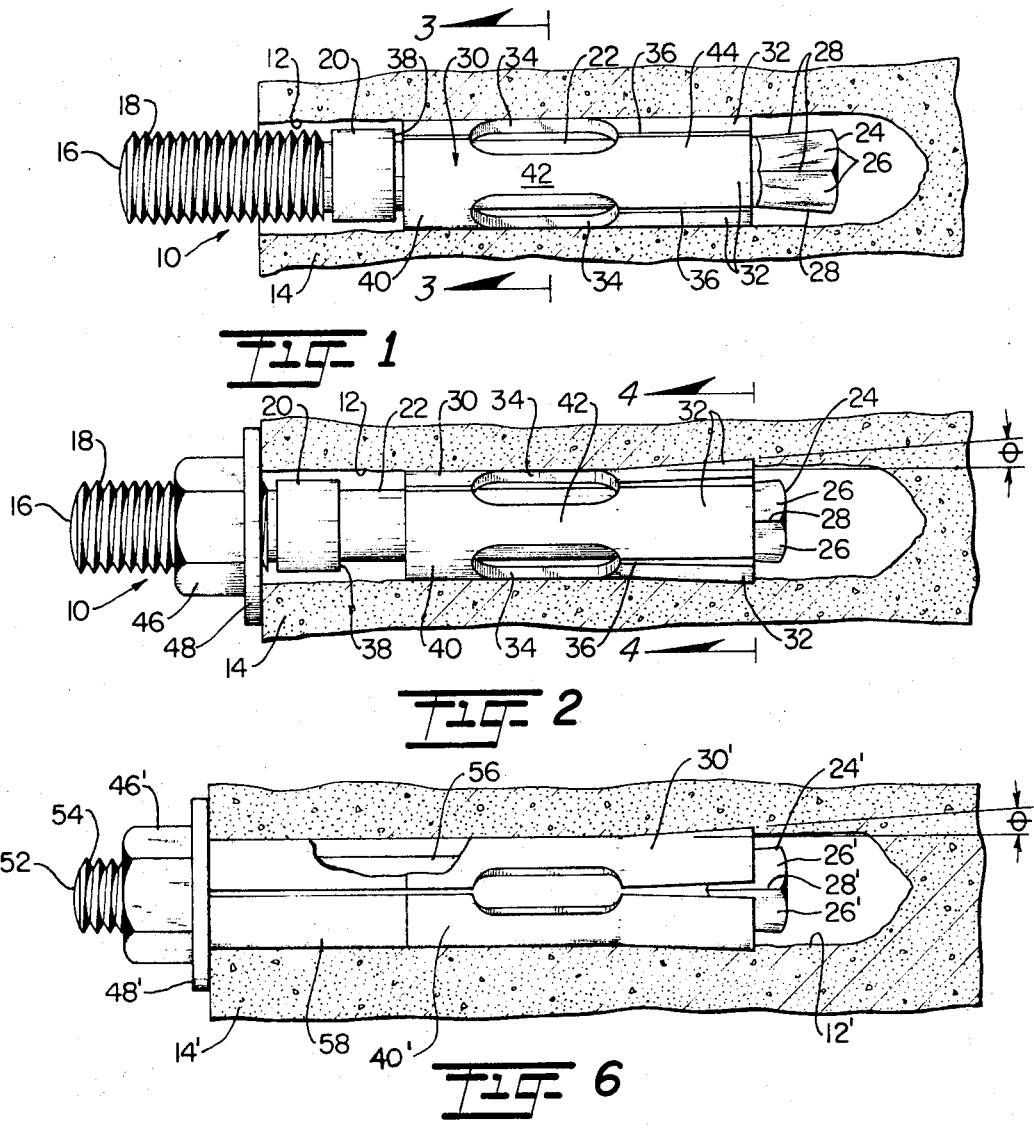
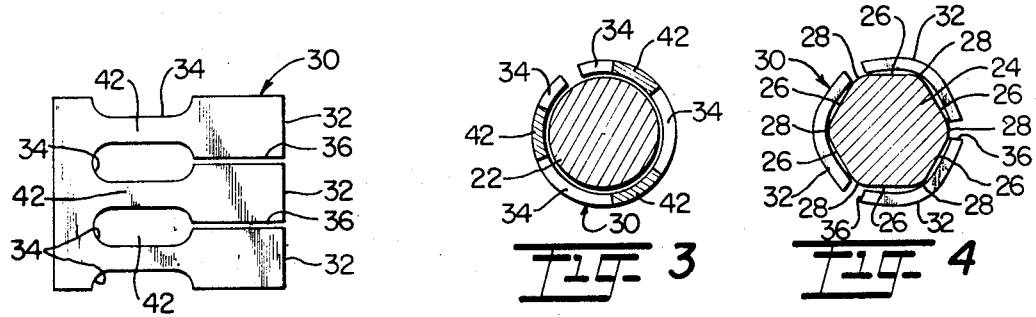
INVENTOR
LESTER LERICH
BY
ATTORNEYS

ANCHOR BOLT WITH EXPANSION SLEEVE

The present invention relates generally to expansion-type bolts, and more particularly relates to anchor bolts characterized by an expansion sleeve which is selectively movable under axial pressure to wedge the bolt in anchored relation within a blind hole or recess formed in rock, concrete, masonry or other like material.

In general, expansion-type bolts are typified by a bolt portion having an outer concentric sleeve or sleeves with movable abutments or compression members positioned at opposite ends of the sleeve section. Upon insertion into a hole, the trailing compression member is manipulated to effect tightening or compression of the sleeve section between the compression members and resultant circumferential movement into wedging engagement with the wall of the recess. Since the leading end compression member is not accessible once positioned in the hole, it is important that it be securely fixed against rotation with respect to the trailing end compression member in order to undergo axial compressive movement against the leading end of the sleeve section; or in other words will not merely follow the rotation of the trailing compression member as the trailing compression member is being tightened.

It is also important for good retention of the bolt in the blind hole or recess that the expansion sleeve be readily flexible in the circumferential direction and that the wedging sections of the sleeve be adapted to wedge at a substantial angle into the side wall of the hole.

The expansion bolt of the present invention was designed to satisfy the above criteria. It is provided with a bolt portion and a concentric expansion sleeve having circumferentially spaced wedging sections with narrow neck portions which will easily flex to allow the sections to be readily and securely wedged into the walls of a blind hole or recess.

The bolt portion of the expansion bolt has an axially adjustable pressure member on its trailing end and a unique integral fixed head on its leading end. The integral head has a plurality of spaced axially extending ridges which are separated by flat bearing surfaces that flare out circumferentially away from the longitudinal axis of the bolt along their extent in the direction of the leading end of the bolt. The bearing surfaces serve to force the wedging sections of the expansion sleeve outwardly into anchored engagement with the wall of the blind hole or recess when the trailing pressure member is tightened on the bolt portion, thus advancing the expansion sleeve toward the leading end of the bolt. The ridges on the integral head at the leading end of the bolt portion fit into and mate with the leading ends of the wedging sections each of which has an axially extending inwardly opening angle adapted to fit over a ridge on the integral head. The interengagement between the integral head and the wedging sections of the expansion sleeve eliminate any relative rotational movement between the expansion sleeve and the bolt portion of an expansion bolt. The frictional engagement of the sleeve with the wall of the blind hole will prevent both the sleeve and the bolt portion from rotating so that the trailing pressure member can be axially screwed onto the bolt portion without the bolt portion turning therewith.

An additional desirable feature of the present invention is the provision of a spacer collar which may be concentrically mounted on the bolt portion in abutting relationship to the trailing end of the expansion sleeve. The spacer collar is a very inexpensive item consisting merely of a sheet of metal rolled into a cylindrical collar to slidably fit around the bolt portion of the expansion bolt. One function of the spacer collar is that it axially spaces the wedging sections of the expansion sleeve from the trailing end of the expansion bolt so that the angle at which the wedging sections are wedged against the wall of the blind hole is greater than if the wedging sections extended substantially the entire length of the bolt. It will be apparent that the greater the angle of wedging, the greater the holding effect will be. Another important function of the spacer collar is to reduce the overall cost of production of various length expansion bolts. This is accomplished by varying the length of the relatively inexpensive spacer collar rather than the length of the expansion sleeve to accommodate various length bolt portions. Thus, only one length of the expansion sleeves need be produced to accommodate any length of bolt thereby alleviating tooling up to machine different length expansion sleeves.

Accordingly, it is an object of the present invention to provide a novel and improved expansion bolt which is relatively inexpensive to manufacture and will readily secure itself in a blind hole or recess.

It is another object of the present invention to provide an expansion bolt having a flared integral head at the leading end adapted to circumferentially expand the expansion sleeve upon axial movement of the trailing pressure members toward the leading end of the bolt.

It is another object of the present invention to provide an expansion bolt having an integral head at its leading end which has axial ridges for mating with longitudinally extending angles on the expansion sleeve whereby relative rotative movement between the expansion sleeve and bolt portion of the expansion bolt is eliminated.

It is still another object of the present invention to provide an expansion bolt which includes a bolt portion having an integral head with bearing surfaces on its leading end, an axially movable pressure member threaded on the trailing end of the bolt, an expansion sleeve concentric with the bolt portion and a concentric spacer collar separating the expansion sleeve from the trailing pressure member.

It is yet another object of the present invention to provide an expansion bolt which has an expansion sleeve characterized by a collar portion and circumferentially attached and spaced wedging sections extending away from the collar portion toward the leading end of the expansion bolt and having relatively narrow neck portions which connect the wedging sections to the collar portion.

The above and other objects, advantages and features of the present invention will become more readily understood and appreciated from a consideration of the following detailed description when taken together with the accompanying drawings, in which:

FIG. 1 is a side elevation of a preferred embodiment of the expansion bolt of the present invention disposed in a blind hole;

FIG. 2 is a side elevation of the expansion bolt of FIG. 1 with the expansion sleeve expanded;

FIG. 3 is a vertical section taken along lines 3—3 of FIG. 1;

FIG. 4 is a vertical section taken along lines 4—4 of FIG. 2;

FIG. 5 is a plan view of the expansion sleeve before it has been rolled into its cylindrical form; and FIG. 6 is a side elevation of another preferred embodiment of the expansion bolt of the present invention.

Referring first to FIG. 1, a first preferred embodiment of the expansion bolt 10 of the present invention is seen inserted into a blind hole or recess 12 in a block of masonry or the like 14. The expansion bolt includes a bolt portion 16 having a threaded shank segment 18 on its trailing end, a blank intermediate shank segment 20, a recessed blank shank segment 22, and an integral head 24 on its leading end.

The integral head 24 has six circumferentially spaced adjoining, substantially flat bearing surfaces 26 defining longitudinally extending straight line ridges 28 at their junctures. The bearing surfaces 26 and the ridges 28 are forwardly divergent toward or in the direction of the leading end of the bolt 10 for reasons to be explained later.

A cylindrical expansion sleeve 30 is adapted to slidably fit concentrically on the recessed shank segment 22 of the bolt portion 16. The expansion sleeve is stamped out of sheet metal and appears as shown in FIG. 5 prior to being rolled into a cylindrical form. In FIG. 5 the expansion sleeve can be seen to be formed from a quadrangular sheet of metal in which wedging sections 32 have been created by punching elongated generally oval-shaped slots 34 at equally spaced intervals, each forming a widened continuation of a parting line or longitudinal slit 36 extending between adjacent wedging sections 32 from the leading end thereof. The sheet metal is then rolled into cylindrical form with the inner diameter slightly larger than the diameter of the recessed shank segment 22 of the bolt portion 16 but slightly smaller than the diameter of the intermediate shank portion 20 and the threaded shank segment 18 of the bolt portion. The expansion sleeve 20 is of limited resiliency so that it can be fitted onto the bolt portion by manually or otherwise circumferentially expanding the sleeve and passing it over the threaded shank segment 18, then forcefully sliding the sleeve along the bolt portion toward the leading end thereof until it snaps down into the recessed shank segment 22. The sleeve will then be retained on the bolt portion 16 between a shoulder 38, separating the intermediate shank portion from the recessed shank portion, and the integral head 24 which has a maximum diameter that is somewhat greater than the inner diameter of the expansion sleeve. The outer diameter of the expansion sleeve normally is slightly greater than the diameter of the blind hole 12 but the sleeve can be manually radially compressed to decrease the outside diameter enough to tightly slide the sleeve with the bolt portion 16 into the blind hole. The shoulder 38 prevents the sleeve from sliding off the bolt portion as the bolt is forced into the blind hole.

The expansion sleeve can be seen to comprise a collar section 40 rearwardly of the three circumferentially spaced wedging sections 32. The wedging sections 32 are integrally connected to the collar section 40 by narrow neck portions 42, between the widened slots 34, which flare or widen out toward the leading end of the bolt into relatively wide wedging portions 44. Preferably the neck portions 42 are approximately one-half the width of the wide portions 44 and, being relatively narrow in width, are more flexible than the wide portions so that the wedging sections 32 can be circumferentially expanded by bending outwardly about the flexible neck portions. It will be appreciated that, while the wedging sections as a group may be said to expand circumferentially, each individual wedging section flexes so that its wide portion moves outwardly in a radial direction. The wide portion 44 of each of the wedging sections can be seen in FIG. 4 to be crimped or bent along its longitudinal center line to form an arcuate segment having a lesser radius of curvature than the collar portion 40 and to conform more to the cross-sectional configuration of the bearing surfaces 26. As a result each segment is formed into an inwardly opening angular section which will more closely conform to and snugly engage the bearing surfaces.

Referring now to FIG. 2, an internally threaded nut or trailing pressure member 46 is seen threaded on the threaded shank segment 18 of the bolt portion 16 against a washer 48. The outer diameter of the washer 48 is greater than the diameter of the blind hole 12 so that the washer abuts against the masonry 14 and will not enter the blind hole. It will then be apparent that, when the trailing pressure member is screwed onto the bolt against the washer 48, the head will be drawn toward the washer 48. The expansion sleeve, as mentioned before, is tightly received in the blind hole and is frictionally prevented to some degree from rotating or moving axially in the blind hole. Therefore, when the head 24 is moved axially in the blind hole toward the washer 48, the six ridges 28 move into the longitudinal angles in the three wedging sections 32 and into the three slits 36 between the wedging sections thereby rotatably locking the bolt portion 16 to the expansion sleeve so that the frictional engagement of the sleeve with the wall in the blind hole also prevents the bolt portion from rotating relative to the sleeve.

Simultaneously with the ridges 28 locking with the expansion sleeve 32, the flat and diverging bearing surfaces 26 on the head 24 expand the wide portion 44 of the wedging sections radially outwardly into more forceful frictional engagement with the wall of the blind hole. It will be observed in FIG. 2 that the wide portion of each wedging section pivots about its associated neck portion 42 so that only a short part of the overall length of the expansion sleeve moves out radially. This means that the portion of the expansion sleeve that does diverge outwardly does so at a greater angle of divergence than if the entire length of the expansion sleeve were to diverge. Accordingly the wedging sections impinge against the wall of the blind hole at a relatively large angle θ for greater gripping power.

A second preferred embodiment of the present invention is shown in FIG. 6 with like parts given like reference numerals with a prime suffix. The embodiment of the expansion bolt of the present invention shown in FIG. 6 and designated 50 can be seen received in a blind hole 12' in a block of masonry or the like 14' and includes a bolt portion 52 having a threaded trailing shank segment 54, a blank intermediate shank segment 56, and an integral head 24' on its leading end identical to the head 24 of the embodiment of FIGS. 1–5. An expansion sleeve 30' is slidably fitted onto the bolt portion 52 and, as can be evidenced by the broken away part of FIG. 6, has an inner diameter slightly larger than the diameter of the threaded shank segment 54 and the intermediate blank shank segment 56 of the bolt portion 52. The outside diameter of the sleeve is normally slightly larger than the diameter of the blind hole 12' but, as with the expansion sleeve 30 of FIGS. 1-5, can be manually radially compressed to fit tightly into the blind hole.

A spacer collar 58, having inner and outer diameters equivalent to those of the expansion sleeve 30', is concentrically mounted on the bolt portion 52 so as to abut at one end against the trailing end of the expansion sleeve. The opposite end of the spacer collar 58 is adapted to abut against a washer 48' which is held on the bolt portion 52 by a nut or trailing pressure member 46'. It is thus apparent that the washer 48', the spacer collar 58, and the expansion sleeve 30' are all retained on the bolt portion 52 between the head 24' and the trailing pressure member 46'.

It will be observed that, as the trailing pressure member is screwed onto the threaded shank segment 54 of the bolt portion 52 against the washer 48', the washer will be forced against the masonry block 14' causing the head 24' to be drawn axially toward the washer 48'. As with the embodiment of FIGS. 1-5, ridges 28' and flat bearing surfaces 26' on the head 24' will positively lock with the expansion sleeve to prevent relative rotation therebetween. Since the expansion sleeve is tightly fitted into the blind hole 12' and is, therefore, prevented to some extent from moving either axially or rotatably, the bolt portion 52 will be prevented from rotating as the trailing pressure member is screwed onto the bolt. Of course, as the head 24 is pulled into the leading end of the expansion sleeve, the wedging sections are forced to expand outwardly by the flat bearing surfaces 26' on the leading compression member.

It will be appreciated that the effective length of the expansion sleeve has been increased by an amount equal to the length of the spacer collar 58. Thus again the wedging sections are impinged against the wall of the blind hole at an angle $\theta$ which is relatively large compared with the angle at which wedging sections would impinge if they had a length equivalent to the entire effective length of the expansion sleeve. Another desirable feature of using the spacer collar is that the effective length of the expansion sleeve can be increased at a relatively low cost. In other words, since the spacer collars can be manufactured at a lower cost than the expansion sleeves (no slots need be punched out of the spacer collars), various length spacer collars can be cut to use in association with one set length of expansion sleeve to vary the effective length of the expansion sleeve at a relatively low cost. Accordingly, a dealer need only stock one length of expansion sleeves to accommodate all of the various length bolt portions which may be used. It will be apparent, however, to those skilled in the art that, if cost were not a prime consideration, the effective length of the expansion sleeve could be lengthened by lengthening the collar portion 40' of the expansion sleeve thereby achieving the same result as when a spacer collar is used.

Although the present invention has been described with a certain degree of particularity, it is understood that the present disclosure has been made by way of example and that changes in details of structure may be made without departing from the spirit thereof.

I claim:

1. An anchor bolt comprising:

a bolt portion with leading and trailing ends, the bolt portion including a threaded portion along the trailing end thereof, an intermediate shank portion and a head at the leading end of the bolt portion, the shank portion including a first shank portion immediately forward of the threaded portion and a second shank portion immediately forward of the first shank portion and of a reduced diameter relative to the first shank portion, said head of the bolt portion having a plurality of substantially flat bearing surfaces diverging radially outwardly in the direction of the leading end of the bolt portion, and ridges defined between said flat bearing surfaces, a one-piece expansion sleeve having forward and trailing ends disposed in outer concentric relation to the second shank portion of the bolt portion, the expansion sleeve including a cylindrical collar portion at the trailing end thereof, a plurality of circumferentially spaced elongated wedging sections integral with and extending forwardly from the collar portion, said wedging sections including neck portions, a plurality of circumferentially spaced slots through the expansion sleeve immediately forward of the collar portion and between the neck portions, and wide portions, the wide portions of said wedging sections each having a centrally located longitudinally extending bend therein forming an arch of lesser radius of curvature than said collar portion, and an axially movable wedge actuating member operably connected to the threaded end of said bolt portion behind the expansion sleeve whereby upon forward movement of the actuating member along the bolt, the wedging sections of the expansion sleeve are caused to flex radially outwardly over the head of the bolt portion and the ridges on the bolt portion are caused to mate with the archs in the wide portions of the wedging sections in preventing relative rotational movement between the expansion sleeve and the bolt portion.

2. The anchor bolt of claim 1 wherein said wide portions of the wedging sections are approximately twice as wide as the neck portions.

* * * * *